United States Patent [19]
Vaccaro et al.

[11] Patent Number: 5,738,907
[45] Date of Patent: Apr. 14, 1998

[54] CONDUCTIVE METAL POROUS SHEET PRODUCTION

[75] Inventors: Anthony J. Vaccaro, Sugar Land, Tex.; Kenneth J. Gregg, Mentor, Ohio; Daniel W. Gibbons, Mentor, Ohio; Janet S. Gregg, Mentor, Ohio; John R. Griesser, Madison, Ohio

[73] Assignee: Eltech Systems Corporation, Chardon, Ohio

[21] Appl. No.: 511,270

[22] Filed: Aug. 4, 1995

[51] Int. Cl.$^6$ .................................................. B05D 3/16
[52] U.S. Cl. .................... 427/172; 75/415; 118/110; 118/123; 204/138; 427/244; 427/404; 427/412.1; 428/312.8; 429/236
[58] Field of Search ...................... 427/58, 121, 171–3, 427/244, 383.1, 404, 412.1; 428/312.8; 429/228, 222, 223, 235, 236; 75/415; 118/110, 123; 205/138

[56] References Cited

U.S. PATENT DOCUMENTS

| | | | |
|---|---|---|---|
| 3,328,505 | 6/1967 | Spencer | 264/321 |
| 3,425,890 | 2/1969 | Powers | 161/46 |
| 3,549,505 | 12/1970 | Hausa | 204/11 |
| 3,694,325 | 9/1972 | Katz et al. | 204/11 |
| 3,763,858 | 10/1973 | Buese | 128/156 |
| 4,251,603 | 2/1981 | Matsumoto | 429/94 |
| 4,326,931 | 4/1982 | Kamijo | 204/22 |
| 4,951,664 | 8/1990 | Niemeyer | 128/206.24 |
| 4,957,543 | 9/1990 | Babjak et al. | 148/525 |
| 5,098,544 | 3/1992 | Brannan | 204/206 |
| 5,300,165 | 4/1994 | Sugikawa | 156/150 |
| 5,374,491 | 12/1994 | Brannan | 429/218 |

FOREIGN PATENT DOCUMENTS

| | | |
|---|---|---|
| 0071119 | 3/1983 | European Pat. Off. . |
| A20402738 | 5/1990 | European Pat. Off. . |
| A20621648 | 7/1993 | European Pat. Off. . |
| A10657950 | 7/1994 | European Pat. Off. . |
| A20710995 | 6/1995 | European Pat. Off. . |

OTHER PUBLICATIONS

International Search Report re PCT/US 96/11422, dated Oct. 23, 1996, Applicant: Eltech Systems Corporation.

*Primary Examiner*—Michael Lusignan
*Attorney, Agent, or Firm*—John J. Freer; David J. Skrabec

[57] ABSTRACT

A porous product, typically a metal foam sheet, is produced as a tailored, engineered product. The porous product can have enhanced strength, as well as more desirable electrical and mechanical properties. The product which first exists typically as a flexible, generally polymeric foam sheet in strip form, which strip is produced in the longitudinal direction, is stretched in a direction other than its direction of production. The porous product can have pores which would be anisotropic in form in usual production, which are stretched to at least substantially isotropic form. The product can even be tailored to have pores which are anisotropic in the direction of the stretch. Thus, an engineered product can be produced which, for example, as an open-cell metal foam prepared from a polymeric foam can have conductivity, both thermal and electrical, as well as strength and ductility, tailored for greater uniformity and performance.

62 Claims, 2 Drawing Sheets

CONDUCTIVE METAL POROUS SHEET PRODUCTION

BACKGROUND OF THE INVENTION

Reticulated porous materials, typically a reticulated metal foam, are made generally in a continuous manner in strip form. Where the reticulated foam will be employed in producing an electrode for a battery, the foam will be an open-cell metallic foam which is filled with an active material.

In the process of continuously preparing the reticulated foam strip as an open-cell metallic foam, usually a non-conductive polymeric foam is initially provided with partial conductivity. Then the metallic foam is produced from this intermediate product by electroplating. For example, in U.S. Pat. No. 4,251,603 there is disclosed coating a foamed resin with carbon black and then plating the coated resin in a Watt's bath. The initial foamed resin can be removed by pyrolysis and the resulting structure is usually annealed.

By pulling the resin sponge while it is being plated, a long strip of resulting electroplated material is produced. The resulting sponge-like porous metal matrix will have substantially spindle-shaped, open pores. An electrode utilizing such a matrix of elongated pores may have the capability of a high density of filled active material, but is not always useful to provide optimal conditions in all battery types.

Problems in providing such a reticulated foam, particularly as a porous metal foam, can include efficient, continuous production as well as plating thickness uniformity for the foam. These problems have been addressed in the teachings of U.S. Pat. No. 4,326,931. This patent discloses a continuous process for treating a non-conductive porous foam to achieve substantially uniform current density and efficiency of metal deposition. To accomplish this, the patent teaches that a strip of foam can be moved through a sequence of electroplating baths. But it is admitted in the patent teachings that there results some deleterious deposition of metal plating on the drum cathode in the initial electroplating bath.

There is then taught in U.S. Pat. No. 5,098,544 a continuous process which can utilize a series of plating zones, with the first zone having a first anode immersed in an electroplating bath. The first cathode, e.g. a drum, is positioned outside the electroplating bath and defines a first plating zone with the immersed anode. By using this positioning, it is taught that the roll cathode does not plate with metal. This can eliminate surface roughness in the plated strip and, owing to a decrease in a need for cleaning the cathode roll, increases the efficiency of the process.

Thus, for the preparation of articles, such as electrodes for high density, high capacity batteries which use a reticulated metal foam matrix, considerable effort has been extended on how to produce, continuously and efficiently, the plated metallic porous sheet supplying the electrode matrix. However, such a sheet for battery electrode use needs to have acceptable tensile strength. This is in order to successfully apply an active substance such as nickel hydroxide as a filling within the metallic porous sheet. Such a need for tensile strength for the sheet has been taught in U.S. Pat. No. 5,300,165. As taught in this patent, difficulties are encountered in plating the metallic porous sheet to a uniform thickness when a thick plating is needed for the required tensile strength. The electroplating of just a foamed resinous sheet is taught by this reference not to provide the desirable parameters needed for battery electrode application. To meet the needs of required tensile strength, plus electrode matrix manufacturing efficiency, combined with the freedom from cracking of the matrix when serving as an electrode for a battery, this patent teaches utilizing a layered sheet approach. The layers combine a foamed sheet and a mesh sheet layer which can be coupled with a non-woven fabric sheet. The resulting product can be achieved by laminating the desired porous sheets of different kinds.

There is still a need for continuously and efficiently producing a sponge-like porous article in strip form which can be utilized, for example, in preparing high density, high capacity battery electrodes. It would be desirable to prepare such articles not only having the desired electrical properties, but also tailored to achieve enhanced mechanical strength. It would be most desirable to be able to produce such articles while being free, during the article manufacture, from the intricacies of laminating a series of different kinds of sheets to prepare the final product.

SUMMARY OF THE INVENTION

The present invention pertains to making porous products including metal foams that can serve as the matrix material for battery electrodes having high current density, high capacity characteristics. The porous products, typically in the form of metal foam sheets, can further have enhanced tensile strength and crack resistance, and are more easily machine produced with these characteristics. They furthermore exhibit desirable ductility and conductivity, both thermal and electrical conductivity. When filled and serving as battery electrodes, the articles can exhibit higher cycle life and high rate discharge.

In one aspect, the invention is directed to the method of producing a strip of an open-cell, three dimensional reticulated sheet of foam having a multitude of pores of rearranged shape, which pores maintain such rearranged shape, the foam strip having a length in the longitudinal direction and a width in the transverse direction, with the length being greater than the width, which method comprises:

(a) establishing said foam strip in production in the longitudinal direction with pores having elongated diameter in the longitudinal direction;

(b) coating the foam strip with coating composition;

(c) stretching the coated foam strip in the transverse direction, thereby elongating pore diameters in the transverse direction and providing a transverse stretch; and (d) heating the coated foam strip while maintaining the transverse stretch, to dry the coating and the foam strip in the transverse stretched position.

Furthermore, the method of the invention can pertain to stretching, then heating, and next coating a foam strip, with each operation as described herein. The invention is further directed to the process of stretching and then coating, with the stretching being followed by heating the foam strip, again as all described herein.

In another aspect, the invention is directed to the method of producing a strip of reticulated foam having a multitude of pores of a shape that is rearranged during production, which foam strip maintains post-production shape, the foam strip having a length in the longitudinal direction and a width in the transverse direction, with the length being greater than the width, which method comprises:

(a) producing the foam strip in the longitudinal direction with pores that are anisotropically dimensioned in the longitudinal direction as determined by their diameter;

(b) stretching the foam strip into a stretched position in a direction other than its direction of production and elongating the pores, as determined by their diameter, in the direction of said stretching;

(c) holding the foam strip in the stretched position; and (d) setting the foam strip in such stretched position.

As another aspect, the invention pertains to the method of making a battery electrode which comprises preparing a strip of electrically conductive foam by the above described process, and applying a filling of active material to the foam.

In a still further aspect, the invention is directed to an apparatus for preparing a strip of reticulated foam which apparatus comprises foam strip production means producing a foam strip in a longitudinal strip direction and foam strip stretching means which stretches the strip in a direction transverse to the longitudinal direction of production.

The present invention is also directed to a strip of reticulated foam having a length in the longitudinal direction and a width in the transverse direction, with the length being greater than the width, which foam strip is produced in the longitudinal direction and stretched in the transverse direction in the manner described hereinabove.

In another aspect, the invention is directed to a reticulated, porous battery electrode having a filling of active material and prepared in the above mentioned method.

BRIEF DESCRIPTION OF THE DRAWINGS

Further features of the present invention will become apparent to those skilled in the art to which the present invention relates from reading the following specification with reference to the accompanying drawings, in which.

DESCRIPTION OF THE PREFERRED EMBODIMENTS

The porous article produced, generally as a strip of conductive reticulated foam, can comprise any of a variety of stretchable substrate materials. Included are polymeric foams, including organic or inorganic open-cellular materials. Synthetic or natural fiber foams, including flexible paper or wood products, and leather can also be useful. Preferably, the substrate material is one which has open interconnected cells. For purposes of the present application, the term "reticulated foam" shall include all such substrate materials.

The article produced in the present invention can be referred to as a porous article sometimes referred to as a "porous product" or, for convenience, simply as a "foam". The porous product is preferably an open-cell three dimensional product having continuously connected strands. This may be referred to herein as a product having "open interconnected cells". However, other porous products, e.g., products which are not open-cell and which may not have continuously connected strands, are contemplated to be within the purview of the invention. The porous product will usually be in sheet form, i.e., have a thickness dimension less than its width or length. More particularly, the product produced will usually be in strip form, having a thickness that is less than the product width, and a width that is less than the product length. However, it is to be understood that the invention is also directed to producing porous articles which are in other forms, e.g., porous products in a form like a log, which product forms can even be square in cross-section. For such a product, the width and thickness can be the same, or at least more substantially the same than for a strip product, but the product can still have a length which is greater than its width or thickness.

The invention is most particularly directed to producing a porous product of a strip, or log, or similarly shaped article wherein the product has a length in the longitudinal direction. This direction can be referred to herein for convenience as the "machine produced" direction. Typically foam in strip form is first produced as a log or bun. This is peeled into layers, generally while the log or bun is spinning. By this spinning and peeling, the foam emerges from the machine foam as a strip. The resulting strip will have a length in the longitudinal direction and a width in the transverse direction and by such production process can have some longitudinal stretch in the foam. By way of example, machine produced polyurethane foams, which may have thicknesses of such small dimension as to be measured in only a few millimeters, can be machine produced to have widths in the transverse direction on the order of 20 to 80 inches, and be produced in continuous lengths which can run as great as on the order of 1,000 feet.

Useful reticulated polymeric foams which may be employed are any of those polymeric substrates which are conventionally used for preparing polymer foams such as polyurethanes, including a polyether-polyurethane foam or a polyester polyurethane foam; polyesters; olefin polymers, such as a polypropylene or polyethylene; vinyl and styrene polymers, and polyamides. Examples of commercially available preferred organic polymer substrates include polyurethane foams marketed by Foamex International, Inc., including polyether-polyurethane foams, and polyester polyurethane foams.

Usually, the foams produced, such as the polyurethane machine produced foams, will be found to have pores which are anisotropically dimensioned in the longitudinal direction. The pores are typically oval, with diameters which are longer in the longitudinal direction of the foam than they are in the width or transverse direction of the foam. The long diameter of the pore oval thus corresponds to the longitudinal dimension of the foam. By the present invention, regardless of the direction of the anisotropy, the porous product is stretched to impact this anisotropy. Where a foam is machine produced and is anisotropically dimensioned with long pore diameters in the longitudinal direction, the stretching may provide pore diameters which are at least substantially isotropic in diameter. These pores after stretching would be more spherical, and could be at least essentially circular in any cross-section. Thus, for example, a foam of oval pores which has initially machine produced enhanced tensile strength as determined in the longitudinal direction, may, by stretching to provide at least substantially isotropic diameter pores, have tensile strength that can be at least substantially equalized for both the transverse and longitudinal direction.

Moreover, reorientation of the pore configurations in accordance with the present invention may provide for pores which have elongated diameter in the direction of the stretch. Thus, they can be stretched so that pores which are initially oval with a length in the longitudinal direction, are reoriented to oval with a length in the transverse direction. For example, where a strip of polymeric foam has, such as by machine production, elongated pore diameters in the longitudinal direction, such a strip can have, after transverse stretching, elongated pore diameters in the transverse direction of the foam.

The present invention is not only directed to such pore reorientation during production, but also to the holding, or maintaining of the reoriented foam in production techniques. As more particularly discussed hereinbelow, it has been found that the foam can be reoriented and the pore reorientation can be "set", which, as the term is used herein, refers to the holding or maintaining of the pore reorientation. For example, a foam in a transverse stretched form can maintain the stretch, after the foam has a coating composition applied thereto and then proceeds through a drying operation. Such holding of the stretch can also be maintained after a coated foam proceeds through other operations, such as electroplating. Representative such operations will be more particularly discussed hereinafter.

The foam, as a representative polyurethane foam, may have an average number of pores per inch within a wide range, typically within a range of about 5 to about 120 pores per inch (ppi). The average number of pores per inch is dictated by application. For instance, for an electrode substrate for a nickel-cadmium battery, it may be desirable to utilize a polymer foam having from about 40 to about 110 pores per inch. For a substrate for an engine piston head, it may be desirable to employ a polymer foam having from about 7 to about 45 pores per inch.

For the present invention, the porous product may be provided with some electrical conductivity, as a prerequisite for electroplating. The term "conductive", when used with the term "porous product" or the like, shall mean a product having at least partial conductivity. A porous product can be made "conductive" employing any of a number of well known procedures such as coating with a latex graphite; electroless plating with a metal such as copper or nickel; coating with an electrically conductive paint, e.g., a paint containing carbon powder, or a metal powder such as silver powder or copper powder; and vacuum deposition of a metal. One suitable electroless plating process is disclosed in the EPO published application 0071119. For convenience, coating compositions such as latex graphite, as well as paints containing carbon black, which paints can contain the carbon black particularly as colloidal dispersions, are generally referred to herein collectively as "electroconductive coating compositions of carbon black". Polyurethane foams which are conductive by coating with a latex graphite are commercially available and are marketed by Foamex International, Inc. These foams typically have a conductivity of about $0.006 \times 1/[ohms \cdot centimeters]$.

Foams that are processed to be conductive, which operation could include a heating step, such as for curing a foam which might be coated with a paint composition of a colloidal dispersion of carbon black, are of particular interest in the present invention. These foams typically proceed through a representative process of foam production, foam coating and heating to cure an applied coating. However, it is to be understood that many other processes are contemplated as serviceable in the present invention, e.g., heating of the foam before coating application, as well as coating of the foam by plating, typically without utilizing heating in the plating operation. Moreover in the representative process including foam coating and heating to cure applied coating, the stretching of the foam in the transverse direction will usually be undertaken between foam coating and heating. However, other procedures can be serviceable, e.g., stretching of the foam before coating and heating.

Figure 1:
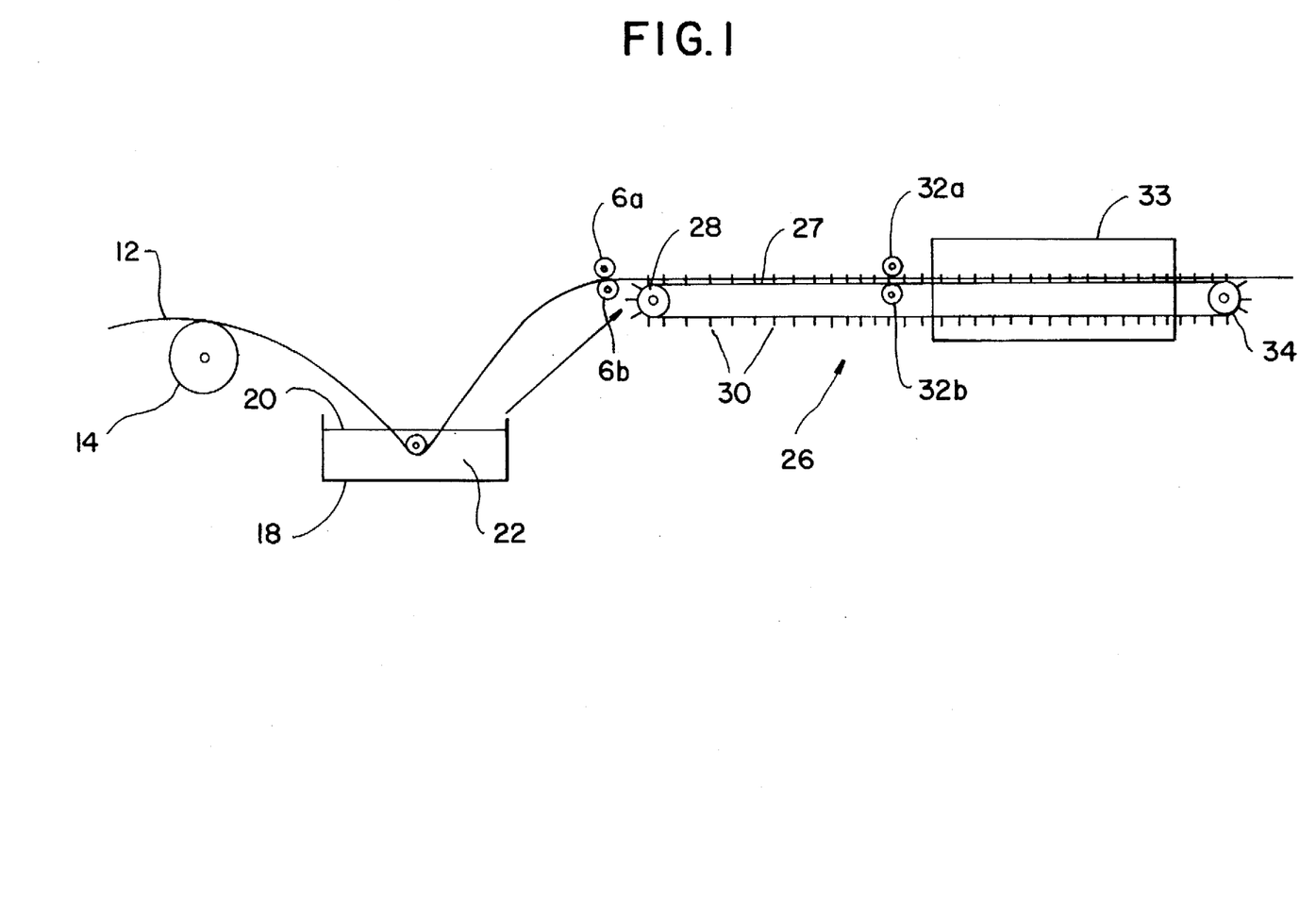
FIG. 1 is an elevation, partial section, schematic view of apparatus including equipment providing a transverse stretch to a reticulated porous strip.

Referring then to the representative process including foam coating and heating to cure applied coating, reference can be made to FIG. 1. In FIG. 1, a strip 12 of porous product is fed from a source not shown over an initial support roll 14 into a coating tank 18. The tank 18 is maintained to a level 20 with a coating bath 22. The coating bath 22 can be any of a number of coating baths containing liquid composition capable of applying a coating, and advantageously one for preparing an initially conductive foam strip. For purposes of this FIG. 1, the longitudinal direction of the strip 12 is the direction from left to right of the figure, which can also be the machine produced direction of the strip 12.

As the strip 12 proceeds through the coating bath 22, the strip 12 becomes immersed in the bath 22 for completing contact between the strip 12 and the coating bath 22. Upon re-emerging from the coating bath 22, the coated strip 12 passes through a pair of pressure rollers 6a and 6b which apply pressure to the strip 12 for removing excess coating composition from the coated strip 12.

As the strip 12 emerges from the pressure rollers 6a, 6b, it proceeds toward spreader equipment 26. This equipment 26 has a belt 27 which travels around a pair of belt rollers 28, 29. The outer surface of the belt 27 carries a series of spikes 30. These spikes 30 puncture the strip 12 along an outer, transverse edge of the coated strip 12. Moreover, by positioning of the spreader equipment 26, the spikes 30 apply a transverse stretch to the coated strip 12.

The coated and stretched strip 12 may then proceed between a pair of optional positioning rollers 32a and 32b whereafter it proceeds into an oven 33. The oven 33 may be used for drying or curing the coating, or for both, which is contained on the coated and stretched strip 12. After proceeding through the oven 33, the stretched strip 12, now containing dried or cured coating, passes over a final support roll 34. The strip 12 may then proceed to further operation, e.g., an electroplating bath, not shown.

Figure 2:
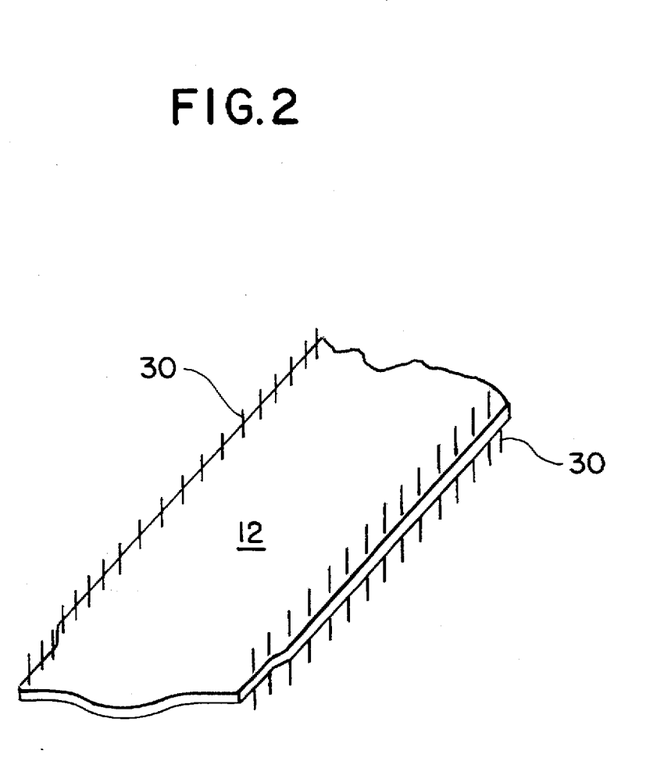
FIG. 2 is a perspective view of a porous strip penetrated at the side edges by spikes providing a transverse stretch to the strip.

Referring more particularly to FIG. 2, a porous strip 12 proceeds over the spikes 30 of spreader equipment (not shown). The spikes 30 protrude through, in a line, a transverse edge of the strip 12. The arrangement of the equipment provides that the line of spikes 30 at each edge of the strip 12 expand the strip 12 in the transverse direction for the strip 12.

Although the expansion equipment depicted in the figures has been shown to be in the nature of a tenter frame, it is to be understood that other apparatus may be suitable. For example, spreader chains, which track along a transverse edge of the strip 12, with the chains at each edge, usually positioned as an opposing pair with one positioned above and one positioned below each edge of the strip 12, can firmly grip the strip 12 at each edge and, by tracking in a manner expanding from edge to edge, can provide for a transverse stretch for the strip 12. The spreader chains may be equipped with spikes that grip the porous strip 12, which chains might then be positioned only below the edge of the strip, rather than paired above and below the strip 12. Also, where the rough surface of the foam acts like a rough surface of tiny hooks which can grab a fabric surface, particularly a fabric pile surface, such characteristic may be utilized in expansion equipment. Thus, fabric spreader ribbons, paired above and below the strip 12, and with a ribbon pair at each edge of the strip, can firmly press upon the strip 12 to grip the strip 12. As with spreader chains, the fabric spreader ribbons contract in an expanding manner and provide a transverse stretch for the strip 12. Other apparatus contemplated for use to provide such a transverse stretch to a foam product include one or more of bowed rolls, spiral grooved rolls, as well as slat expanders, or their combinations.

As has been depicted in FIG. 1, the stretching of the foam in accordance with the present invention can be done in a sequence of operations, e.g., first applying a coating composition, then stretching followed by heating of the foam strip 12. Additionally, it is contemplated that operations may be combined. For example, the stretching apparatus as depicted in FIG. 1, i.e., in the nature of a tenter frame, may be used together with a curtain coater, to stretch the foam as it is coated. However, it will be understood that other stretch apparatus, as mentioned hereinbefore, may be useful in combination operations. This may be other apparatus used in conjunction with, or as replacement for, the depicted spreader equipment 26.

Where the porous product is stretched in a processing manner as depicted in FIG. 1, i.e., where a coating composition has been applied, or where the porous product is stretched in any other processing manner, e.g., where the coating application and stretching have been done together, it is contemplated that the product can be held in stretched form through a subsequent heating operation. For this, the strip 12 can be maintained on stretching apparatus and continue in stretched condition through the oven 33. For a representative polyurethane foam that has been coated to provide conductivity and the coated foam will be heated, such can typically be handled at a temperature within the range of from about 250° F. to about 500° F. In the oven 33, the heating of the coating can be useful to set the strip 12 in stretched form after it releases from the spreader equipment 26, as by curing crosslinking agents of the coating to set the stretch. In any operations where the foam is coated, the coating can be particularly advantageous for holding the strip 12 in stretched form after release from equipment stretching the strip 12. The coating can help provide strength to the final foam product in stretched condition, thereby helping to create a firm set to the stretched foam.

As will be understood, heating can be utilized not only to cure an applied coating, but also merely for drying, e.g., to dry a foam still wet as from foam production, or to dry a foam which is wetted by a coating that needs only to be dried, but would not need heating to cure the applied coating. Where a liquid coating composition has been applied to the strip 12 and the resulting wet strip 12 need only be dried, it is contemplated that the strip 12 will nevertheless most always be heated to dry the coating. This will advantageously be the case for efficient operation. Where stretching follows coating and a liquid coating composition has been used, if the coating is to be dried before stretching, it is preferred that the foam remain moist to the touch after drying and before stretching.

It will be understood that although application of liquid coating compositions to provide for a conductive foam are of particular interest, that it is contemplated to apply other coatings. For example, applied coatings may be dry coatings, as applied powder coatings. As noted hereinabove, the liquid coating compositions can include not only those which can simply air dry at ambient temperature, but also those that require heating to cure the applied coating. In general, liquid coating compositions will include any suitable paint, e.g., a paint or primer. Such paints may contain pigment in a binder or can be unpigmented for example a cellulose lacquer. The paints most always contemplated will be water based, e.g., latex or water-soluble resins, or solvent plus water based as with an alcohol plus water base.

It is contemplated that the procedure of maintaining a foam in stretched condition through a further operation will lend itself to various step-wise operations, in addition to those specifically described hereinabove. For example, where an electroplated foam might be fed into a further metal working operation, such as a tempering operation, it is contemplated that the electroplated foam may be held in place, such as by spreader chains, through the electroplating as well as the tempering operation. Further combinations of operations, where stretching is an integral part of the operation, include heating such as of uncoated foam as the stretching of the foam is undertaken. For this, the stretching apparatus may be installed in an oven. A further combination operation could include electroplating utilizing spreading apparatus such as spiral grooved rolls or bowed rolls in the electroplating apparatus.

In many such operations, e.g., drying of a wet foam, or curing of an applied coating composition, the foam if not held in place may exhibit shrinkage, usually most notably in the transverse direction. This can occur even when utilizing forced air circulation as in oven drying. Thus, there is a "stretching" of the sheet 12, i.e., non-shrinkage, as in the oven 33, if the sheet 12 is merely held in shape through the oven 33. By use of the word "stretching" herein, as in the phrase "stretching in the transverse direction", it is meant to include maintenance of shape, as against shrinkage, through an operation such as drying. Where the porous product is not just maintained, but further stretched in the manner as depicted in FIG. 2, i.e., a porous sheet 12 is stretched in transverse direction, such may sometimes be referred to herein as a "positive stretch" or the like. Where the sheet 12 is a representative open-cell commercial polyurethane foam, this positive transverse stretching will usually be on the order of from about 5% up to about 40%. Thus, a strip 12 having a width of about 28 inches, as it proceeds through the coater 18, may have a width from positive stretching which varies from about 29 inches to about 40 inches as it proceeds into the oven 33. In the representative polyurethane foam, where pores in foam production are anisotropically dimensioned in the longitudinal direction as determined by their diameter, a positive transverse stretch of less than about 5% may not be sufficient for providing at least substantially isotropic pores. However, such minimum positive stretch of at least about 5% can provide for a resulting foam which is tailored to increase the tensile strength of the foam in the transverse direction, without substantially decreasing the tensile strength of the foam in the longitudinal direction. Advantageously, where such representative commercially available polyurethane foam is to be transversely positively stretched to provide pores which are substantially isotropic in diameter, the stretch will be on the order of about 15% to about 20%.

Usually, such positive transverse stretching of a sheet 12 will not exceed about 40%. This essentially maximum transverse stretch of 40% can provide for the representative polyurethane foam having pores which, before stretching, have elongated diameter in the longitudinal direction of the foam, and which after transverse stretching, have elongated diameter in the transverse direction of the foam. Thus, the foam is tailored by such maximum stretching to maximize the potential tensile strength of the foam in the transverse direction. It is to be understood that although stretching herein is usually described as "transverse" stretching, where the porous product is more in the nature of a log, as an example, the stretching is simply in a direction in which it is feasible to stretch the porous product.

For many applications, the stretched porous product having the cured coating thereon, will be electroplated, as with one or more of copper, nickel, zinc, cobalt, tin, iron or their alloys. Where the resulting electroplated foam is to be later used, such as for the matrix of a battery electrode, the plated structure is typically subjected to pyrolysis or combustion. Pyrolysis or combustion is usually undertaken for decomposing and removing, as by burning, initial reticulated material, e.g., substrate polymeric foam, and can also remove a coating on the foam such as from a colloidal dispersion of carbon black. Typically, pyrolysis will be conducted at a temperature in the range from about 500° C. to about 900° C. for a few minutes, e.g., 1–5 minutes, although longer pyrolysis times such as up to three hours may be used, depending upon the initial matrix material. Such procedure can be followed by annealing, using conventional annealing techniques to, for example, improve product ductility. For instance, if the electroplating has been nickel electroplating, annealing can take place in a hydrogen environment at about 800° C. to about 1200° C. for a few minutes, such as 6–12 minutes, although longer times up to about 30 minutes may be employed. Procedures for nickel electroplating of an initially conductive foam, as well as subsequent pyrolysis and annealing, have been taught for example in U.S. Pat. No. 5,098,544.

Where the porous product is an open-cell, reticulated metal sheet, it can be used for the production of battery electrodes. When open-cell foam is used, a fairly uniform plated sheet may be attained (uniformity across the direction of the thickness of the sheet). The ratio of plated metal between the cell strands at the surface area of the sheet, and cell strands at the central part of the sheet, may vary. This is expressed as a ratio of the outermost fiber plating deposit thickness, to the innermost fiber plating deposit thickness. This ratio can be termed a deposit thickness ratio, also called a differential thickness ratio or, in either case, the DTR. Prepared sheets of reticulated metal foam are contemplated to have a DTR as low as 1:1. They have been taught, e.g., in U.S. Pat. No. 3,694,325, to have a DTR as small as 1.05:1. However, much greater DTR's, such as up to 4:1 or even 5:1 may be produced.

The present invention is especially useful when the coated sheet is processed to a plated sheet, typically a nickel plated sheet which can be utilized in preparing a nickel electrode of a nickel-cadmium battery, or nickel electrode of a nickel-metal hydride battery, or as an electrode substrate for a lithium-ion battery. Conventionally, nickel sheets for this application have a number of pores of from about 50–120 pores per inch (ppi), thickness on the order of from about 0.5 mm to about 3.0 mm and a porosity of 90–95%. For such reticulated metal sheets, the DTR can vary within the range from typically about 1:1 to about 3.5:1, although it may be more, such as the above mentioned 5:1. Nickel electrodes from such sheets, carrying plating weights within the range from about 200–1,000 grams per square meter, have been described in U.S. Pat. No. 5,374,491. As discussed therein, the reticulated nickel sheets can have surface pore diameters ranging from about 200 microns to about 450 microns although they can be greater, e.g., up to 500–1300 microns. For preparing an electrode, the sheet is then filled with an active material, or "paste", such as of cadmium or one or more of the hydroxides of copper, nickel, i.e., $Ni(OH)_2$, zinc, cobalt, iron or their alloys. For a lithium-ion battery, the sheet can be filled with a paste of a carbonaceous intercalation compound.

As has been discussed hereinbefore, the present invention can be effective for not only tailoring a product having enhanced tensile strength in a desired direction, but also for arranging pore size for the product. Additional characteristics may also be achieved. For example, open-cell reticulated nickel sheets useful as battery electrode substrates may have modified resistivities. Thus, even where the product is initiated by production of a machine produced representative polyurethane foam, subsequent operation in accordance with the present invention can provide for a nickel sheet electrode substrate having resistivities which are substantially similar in both the longitudinal and transverse directions. This characteristic can be desirable since it will provide for a uniform current flow pattern, e.g., a uniform utilization of active material during a high rate discharge.

The following examples show ways in which the invention has been practiced but should not be construed as limiting the invention.

EXAMPLE 1

A commercially available soft, open cell foam in strip form, which was grade Z-110 polyurethane foam available from Foamex International, Inc., was used. A sample of this strip, about 6 meters long, was 73 cm. wide and 1.65 cm. in thickness. It had a weight of 50 grams per square meter ($g/m^2$). It was coated in a trough containing a colloidal dispersion of carbon black for purposes of preparing a semi-conductive foam. On removal from the coating trough, the emerging foam strip sample was squeezed by feeding through rollers to remove excess coating composition.

As the resulting coated foam emerged from these rollers, it proceeded onto a tenter frame. The frame had two parallel rows of spikes, each row extending in front of the foam, one row at each side edge of the foam. The emerging foam was then manually pulled in a transverse direction to stretch the foam and pull it over the spikes. The resulting transverse stretched foam, held on the spikes, proceeded through a drying oven maintained at 330° F. (166° C.). The foam was maintained in the drying oven for approximately 8.5 minutes, achieving a foam temperature of about 330° F. Upon emerging from the oven, the stretched foam was permitted to cool. Upon cooling, the foam which had an initially 73 cm width was found to be stretched to a 79 cm width. Furthermore, the average thickness was found to be 1.62 mm, as compared to the original 1.65 mm thickness.

This resulting foam, having initial conductivity, was then electroplated in the continuous plating apparatus of U.S. Pat. No. 5,098,544. Electroplating was carried out at a line speed of about 3.5 inches per minute. The electroplate bath was a nickel-sulfamate bath maintained at a pH of about 3.7 and a temperature of about 60° C. The nickel plated foam was then pyrolyzed at 775° C. for 2 minutes in air and annealed at a temperature of 950° C. for a time of 7.2 minutes in hydrogen. This removed the polyurethane foam and provided an open-cell metallic nickel foam.

A sample of the resulting reticulated nickel foam, of a size approximately one inch by 6 inches, was then inserted in a Tinius Olsen Series 1000 tensile tester for tensile strength testing. The results of testing six samples indicated a longitudinal tensile strength, expressed as kilograms per 20 millimeters (kg/20 mm) for the nickel foam of 5.10. The samples tested showed an average transverse tensile strength for the foam of 4.14 kg/20 mm. This compares with a transverse tensile strength of 2.8 kg/20 mm for this typical product in unstretched form, or a transverse strength increase of 48%.

In the tensile test, the samples were also evaluated for elongation. For elongation the samples were stretched with the tensile test apparatus and the elongation is the distance traveled, in millimeters, before breaking. For the transverse stretched, nickel foam samples tested, the longitudinal elongation was 8.21 mm and the transverse elongation was 13.9 mm.

Samples were also tested for resistivity using a four point probe resistivity measurement technique. For this test, one inch by six inch strip samples were used and the distance was 3.81 inches between contacts. The resistance, in milliohms (mΩ), was obtained by measuring the voltage drop in passing one ampere of current between the contacts. For the transverse stretched, nickel foam samples, this resistance was 13.1 mΩ in the longitudinal direction and 16.7 mΩ in the transverse direction. These figures thus showed a resistance ratio for the sample of 1.28.

A sample of the stretched nickel foam product was evaluated for deposit thickness ratio (DTR). This evaluation was conducted in accordance with the procedure detailed in Example 1 of U.S. Pat. No. 5,374,491, the disclosure of which is incorporated herein by reference. As a result of such tests, the DTR for the foam was found to be 2.9:1. Plated samples were also evaluated for pores per inch (ppi). This evaluation was also done in accordance with the method as described in Example 1 of U.S. Pat. No. 5,374,491. As a result of such evaluation, the pore per inch for the nickel foam was found to be 54 (average of two samples), compared to a typical plated foam average of approximately 65–70.

EXAMPLE 2

There was again used a commercially available soft, open cell foam in strip form. It was grade Z-75 polyurethane foam available from Foamex International, Inc. and had approximately 45 pores per inch. As in Example 1, this foam was prepared in semi-conductive form by coating with a colloidal dispersion. The foam strip was then stretched in the transverse direction approximately 10% on a tenter frame before drying at 330° F. The resulting foam was then nickel electroplated, and subsequently pyrolyzed and annealed, all in the manner as described in Example 1.

Samples of the resulting reticulated nickel foam were weighed and found to have an average weight of 506 g/m$^2$ (average of six samples) compared to the weight of 44 g/m$^2$ for the unstretched urethane foam. Samples were also measured and found to have a thickness of 1.56 mm for the nickel foam, as compared to the original 1.6 mm thickness for the initial foamed urethane strip (average of six samples).

In the manner as described in Example 1, samples were then tested for tensile strength, expressed as pounds per inch (lb/in), and for elongation. Results from such testing, in both the longitudinal (Long.) as well as the transverse (Trans.) direction of the nickel foam are reported in Table 1 hereinbelow. Also reported in the Table below are average elongation and tensile strengths for a comparative metallic nickel foam, where the initial polymer foam is unstretched in the transverse direction. That is, the comparative nickel foam is a typical product resulting from the hereinbefore described procedures, but without transverse stretching of the polyurethane foam, where the procedure is initiated with the same Z-80 polyurethane foam of 1.6 mm thickness.

TABLE 1

|  | Average Tensile Strength (lb/in) | | Average Elongation (inches) | |
| --- | --- | --- | --- | --- |
|  | Long. | Trans. | Long. | Trans. |
| Comparative Foam | 17 | 10 | 0.32 | 0.70 |
| Invention Foam (10% Stretch) | 15.8 | 13.7 | 0.61 | 0.60 |

As can be seen from the above table, transverse stretching provides for a nickel foam product having virtually identical elongation in both the longitudinal as well as the transverse direction. Moreover, from such transverse stretching, the tensile strength for the metallic nickel foam in the longitudinal direction is only 1.15 times greater the tensile strength value in the transverse direction. This compares with the much greater 1.7 times value for the comparative product.

Furthermore, samples of the metallic nickel foam were tested for resistivity. This test was conducted in the manner as described in Example 1. For the invention foam, the average resistance in the longitudinal direction was 13.8 mΩ and in the transverse direction was 15.1 mΩ. This provided a resistance ratio of 1.10. Comparatively, such ratio for the typical, comparative product, can be expected to be about 1.7.

EXAMPLE 3

There was again used the Z-75 polyurethane foam in strip form detailed in example 2. From this foam, there was produced a metallic nickel foam in the manner as described in Example 2, except that after coating with the colloidal dispersion of carbon black, and before drying, the foam proceeded through about 15% transverse stretching.

Samples from the resulting reticulated nickel foam were tested for average tensile strength, and average elongation in both the longitudinal (Long.) and transverse (Trans.) directions, as well as for average resistivity, all in the manner as described in Example 1. Results from this testing are reported in Table 2 below. Also reported in Table 2 are the results of such testing for samples of a comparative product, which is also a metallic nickel foam. This comparative product is produced in the same manner as described in this Example, but there is no transverse stretching of the polyurethane foam. The comparative product is initiated with the same commercially available urethane foam having a thickness of 1.6 mm. Results of all testing for the comparative product as well as the invention material are presented in Table 2 below.

TABLE 2

|  | Average Tensile Strength (lb/in) | | Average Elongation (Inches) | | Average Resistivity* | |
| --- | --- | --- | --- | --- | --- | --- |
|  | Long. | Trans. | Long. | Trans. | Long. | Trans. |
| Comparative Foam | 14.5 | 8.5 | 0.3 | 0.65 | 4.0 | 6.6 |
| Invention Foam (15% Stretch) | 14.4 | 12.7 | 0.62 | 0.47 | 4.2 | 4.5 |

*Expressed as mΩ · cm.

As noted in the Table, the longitudinal tensile strength for the innovative product is only 1.13 times the transverse strength value. Furthermore, the average elongation for the innovative product shows highly desirable equilibration between the longitudinal and transverse elongation, as compared to such elongation for the typical, comparative product. Lastly, the innovative product has a resistance ratio of only 1.07. Thus, it is seen in transverse stretching that a tailored product can be prepared having highly desirable equilibration, when comparing longitudinal versus transverse values, for tensile strength, average elongation and average resistivity.

We claim:

1. The method of producing a strip of an open-cell, three dimensional reticulated sheet of electroconductive foam having a multitude of pores of rearranged shape, which pores maintain said rearranged shape, the foam strip having a length in the longitudinal direction and a width in the transverse direction, with the length being greater than the width, which method comprises:

(a) establishing said foam strip in production in the longitudinal direction with pores having elongated diameter in the longitudinal direction;

(b) coating said foam strip with electroconductive coating;

(c) stretching said coated foam strip in the transverse direction, thereby elongating pore diameters in the transverse direction and providing a transverse stretch to said coated foam strip; and (d) heating the coated foam strip while maintaining said transverse stretch, to dry said coating and set said foam strip in a transverse stretched position.

2. The method of claim 1 wherein said foam is positively transverse stretched in an amount within the range from about 5% to about 40%, basis the width of said foam as established in production, said foam is coated with a coating composition of carbon black while under transverse stretch, and then heated at a temperature within the range from about 250° F. to about 500° F. to prepare said foam strip with electroconductive coating.

3. The method of claim 1, wherein said foam is established in production with pores that are anisotropically dimensioned in the longitudinal direction, as determined by pore diameter, which pores are stretched to at least substantially isotropic dimension, as determined by pore diameter.

4. The method of claim 1, wherein said foam is established in production with anisotropic pores having elongated diameter in the longitudinal direction which are stretched to anisotropic pores having elongated diameter in the transverse direction.

5. The method of claim 1, wherein at least said coating, stretching and heating are produced in continuous sequence.

6. The method of claim 1, wherein said foam strip is transversely stretched while said foam is coated.

7. The method of claim 1, wherein said coated foam strip is transversely stretched while said foam is heated.

8. The method of claim 1, wherein said foam is stretched by passage through or over one or more of bowed rolls, slat expanders, spreader chains, fabric spreader ribbons, or spiral grooved rolls.

9. The method of making a battery electrode which comprises preparing a strip of electroconductive foam by the process of claim 1 and applying an active material filling to said foam.

10. A battery having a battery electrode made by the method of claim 9 and selected from the group consisting of nickel-cadmium, nickel-metal hydride and lithium-ion batteries.

11. The method of producing a strip of an open-cell, three dimensional reticulated sheet of electroconductive foam having a multitude of pores of rearranged shape, which pores maintain said rearranged shape, the foam strip having a length in the longitudinal direction and a width in the transverse direction, with the length being greater than the width, which method comprises:

(a) establishing said foam strip in production in the longitudinal direction with pores having elongated diameter in the longitudinal direction;

(b) stretching said foam strip in the transverse direction, thereby elongating pore diameters in the transverse direction and providing a transverse stretch;

(c) coating said transversely stretched foam strip with electroconductive coating while maintaining said transverse stretch; and (d) heating the coated foam strip while maintaining said transverse stretch, to dry said coating and said foam strip in the transverse stretched position.

12. The method of claim 11 wherein said foam is positively transverse stretched in an amount within the range from about 5% to about 40%, basis the width of said foam as established in production, said foam is coated with a coating composition of carbon black while under transverse stretch, and then heated at a temperature within the range from about 250° F. to about 500° F. to prepare said foam strip with electroconductive coating.

13. The method of claim 11, wherein said foam is established in production with pores that are anisotropically dimensioned in the longitudinal direction, as determined by pore diameter, which pores are stretched to at least substantially isotropic dimension, as determined by pore diameter.

14. The method of claim 11 wherein said foam is established in production with anisotropic pores having elongated diameter in the longitudinal direction which are stretched to anisotropic pores having elongated diameter in the transverse direction.

15. The method of claim 11, wherein at least said stretching, coating and heating are produced in continuous sequence.

16. The method of claim 11 wherein said foam strip is transversely stretched as said foam is coated.

17. The method of claim 11, wherein said foam is stretched by passage through or over one or more of bowed rolls, slat expanders, spreader chains, fabric spreader ribbons or spiral grooved rolls.

18. The method of making a battery electrode which comprises preparing a strip of electroconductive foam by the process of claim 11 and applying an active material filling to said foam.

19. A battery having a battery electrode made by the method of claim 18 and selected from the group consisting of nickel-cadmium, nickel-metal hydride and lithium-ion batteries.

20. The method of producing a strip of an open-cell, three dimensional reticulated sheet of electroconductive foam having a multitude of pores of rearranged shape, which pores maintain said rearranged shape, the foam strip having a length in the longitudinal direction and a width in the transverse direction, with the length being greater than the width, which method comprises:

(a) establishing said foam strip in production in the longitudinal direction with pores having elongated diameter in the longitudinal direction;

(b) stretching said foam strip in the transverse direction, thereby elongating pore diameters in the transverse direction and providing a transverse stretch;

(c) heating the foam strip while maintaining said transverse stretch, to set said foam strip in a transverse stretched position; and (d) coating said foam strip of transverse stretched position with electroconductive coating.

21. The method of claim 20 wherein said foam is positively transverse stretched in an amount within the range from about 5% to about 40%, basis the width of said foam as established in production, said foam is coated with a coating composition of carbon black while under transverse stretch, and then heated at a temperature within the range from about 250° F. to about 500° F. to prepare said foam strip with electroconductive coating.

22. The method of claim 20 wherein said foam is established in production with pores that are anisotropically dimensioned in the longitudinal direction, as determined by pore diameter, which pores are stretched to at least substantially isotropic dimension, as determined by pore diameter.

23. The method of claim 20, wherein said foam is established in production with anisotropic pores having elongated diameter in the longitudinal direction which are stretched to anisotropic pores having elongated diameter in the transverse direction.

24. The method of claim 20, wherein at least said stretching, heating and coating are produced in continuous sequence.

25. The method of claim 20, wherein said foam strip is transversely stretched as said foam is heated.

26. The method of claim 20, wherein said foam is stretched by passage through or over one or more of bowed rolls, slat expanders, spreader chains, fabric spreader ribbons or spiral grooved rolls.

27. The method of making a battery electrode which comprises preparing a strip of electroconductive foam by the process of claim 20 and applying an active material filling to said foam.

28. A battery having a battery electrode made by the method of claim 27 and selected from the group consisting of nickel-cadmium, nickel-metal hydride and lithium-ion batteries.

29. The method of producing a strip of reticulated, electroconductive foam having a multitude of pores of a shape that is rearranged during production, which foam strip maintains post-production shape, the foam strip having a length in the longitudinal direction and a width in the transverse direction, with the length being greater than the width, which method comprises:
  (a) producing said foam strip in the longitudinal direction as an open-cell, non-conductive foam with pores that are anisotropically dimensioned in the longitudinal direction as determined by their diameter;
  (b) stretching said foam strip into a stretched position in a direction other than its direction of production and elongating said pores, as determined by their diameter, in the direction of said stretching;
  (c) holding said foam strip in the stretched position; and
  (d) setting said foam strip in said stretched position, in processing said foam to said electroconductive foam.

30. The method of claim 29, wherein said stretching, holding and setting are produced in continuous sequence.

31. The method of claim 29, wherein said foam is stretched into said stretched position on a support.

32. The method of claim 31, wherein said foam is held on said support and heated to set said foam in said stretched position.

33. The method of claim 29 which comprises producing said foam in a longitudinal strip direction and stretching said foam in a transverse strip direction.

34. The method of claim 29, wherein said foam is stretched in said transverse direction during foam production.

35. The method of claim 30, wherein said foam is produced as a three dimensional reticulated sheet having continuously connected strands, and said foam is stretched in the transverse direction, and said stretch is held in the stretched position.

36. The method of claim 35, wherein said foam in stretched position is set in processing including heat application to said foam.

37. The method of claim 35, wherein said foam is stretched and set in processing, which processing includes one or more of electroless plating, electroplating, or painting with electroconductive paint.

38. The method of claim 37, wherein said foam is painted with electroconductive paint, stretched in a transverse strip direction, and said stretched position is set by heating to dry applied paint.

39. The method of claim 38, wherein said foam is painted with a colloidal dispersion of carbon black, positively transverse stretched in an amount within the range from about 5% to about 40%, basis the width of said foam before coating, and then heated at a temperature within the range from about 250° F. to about 500° F.

40. The method of claim 37, wherein said plating is conducted on an open-cell, three dimensional reticulated polyurethane sheet having continuously connected strands, and said plating provides a metal on said strands of one or more of copper, nickel, zinc, cobalt, tin, iron or alloys thereof.

41. The method of claim 40, wherein said plated foam is heated to thermally decompose a reticulated polymeric core and remove an electroconductive paint.

42. The method of claim 29, wherein said foam is produced with pores that are anisotropically dimensioned in the longitudinal direction, as determined by their diameter, which pores are stretched to at least substantially isotropic dimension, as determined by their diameter.

43. The method of claim 29, wherein said foam is produced with anisotropic pores having elongated diameter in the longitudinal direction which are stretched to anisotropic pores having elongated diameter in the transverse direction.

44. The method of claim 29, wherein said foam is stretched by passage through or over one or more of bowed rolls, slat expanders, spreader chains, fabric spreader ribbons, or spiral grooved rolls.

45. The method of claim 29, wherein said foam is a polymeric strip selected from the group consisting of polyurethane, polyester, polyolefin, polyvinyl, polystyrene and polyamide reticulated foam, and said strip has an average number of pores per inch within the range from about 5 to about 120.

46. The method of claim 29, wherein said foam strip has a strip thickness within the range from about 0.5 mm to about 3.0 mm, has a deposit thickness ratio in the range of about 1:1 to about 5:1, and has an average diameter of the pores on the surface of the strip from about 200 microns to about 1300 microns.

47. The method of making a battery electrode which comprises preparing a strip of electroconductive foam by the process of claim 29 and applying an active material filling to said foam.

48. The method of claim 47, wherein applying an electrode filling to said foam provides filling within pores which are stretched in a transverse strip direction.

49. A battery having a battery electrode made by the method of claim 47 and selected from the group consisting of nickel-cadmium, nickel-metal hydride and lithium-ion batteries.

50. The method of making a current collector which comprises preparing a strip of electroconductive foam by the process of claim 29.

51. A strip of reticulated foam having a length in the longitudinal direction and a width in the transverse direction, with the length being greater than the width, which foam strip is produced in the longitudinal direction and stretched in the transverse direction by the method of claim 29.

52. Apparatus for preparing a strip of open-cell, three-dimensional reticulated foam, which apparatus comprises:
  (a) foam strip production means producing a foam strip in a longitudinal strip direction;
  (b) foam strip stretching means which stretches said strip in a direction transverse to said longitudinal direction of production; and (c) coating means applying a coating to said foam strip.

53. The apparatus of claim 52, wherein said foam strip stretching means is one or more of bowed rolls, slat expanders, spreader chains, fabric spreader ribbons, or spiral grooved rolls.

54. The apparatus of claim 52, wherein said foam strip stretching means stretches said foam during or after foam production.

55. The apparatus of claim 54, wherein heating means applies heat to said foam strip after stretching.

56. The apparatus of claim 52, wherein said foam strip coating includes one or more of electroless plating, electroplating or painting.

57. The apparatus of claim 52, wherein said coating means applies coating to said foam strip before or during stretching, and heating means applies heat to said foam strip after stretching.

58. The apparatus of claim 57, wherein said coating means applies electroconductive paint to said foam strip, said paint comprises a colloidal dispersion of carbon black, said stretching means stretches said foam in an amount within the range of from about 5% to about 40% basis the width of said foam strip before coating, and said drying means applies heat to said foam at a temperature within the range from about 250° F. to about 500° F.

59. The apparatus of claim 56, further including plating means plating an open-cell, three dimensional reticulated polyurethane foam sheet having continuously connected strands with a plated metal of one or more of copper, nickel, zinc, cobalt, tin iron or alloys thereof.

60. A stretched and coated open-cell, three dimensional reticulated foam produced by the apparatus of claim 52.

61. A stretched and metal plated open-cell, three dimensional reticulated foam produced by the apparatus of claim 59.

62. The method of producing a strip of an open-cell, three dimensional reticulated sheet of foam as the matrix material for a battery electrode, said sheet of foam having a multitude of pores of rearranged shape, which pores maintain said rearranged shape, the foam strip having a length in the longitudinal direction and a width in the transverse direction, with the length being greater than the width, which method comprises:

(a) establishing said foam strip in production in the longitudinal direction with pores having elongated diameter in the longitudinal direction;

(b) coating said foam strip with coating composition;

(c) stretching said coated foam strip in the transverse direction, thereby elongating pore diameters in the transverse direction and providing a transverse stretch to said coated foam strip; and (d) heating the coated foam strip while maintaining said transverse stretch, to dry said coating and set said foam strip in a transverse stretched position;

with the proviso that said step (c) stretching, or said steps (c) and (d) stretching and heating, can precede said step (b) coating.

* * * * *